(12) United States Patent
Fery et al.

(10) Patent No.: US 8,611,202 B2
(45) Date of Patent: Dec. 17, 2013

(54) OPTICAL STORAGE MEDIUM COMPRISING TWO NONLINEAR LAYERS

(75) Inventors: Christophe Fery, Schwieberdingen (DE); Larisa Von Riewel, Mainaschaff (DE); Gael Pilard, Marly (FR)

(73) Assignee: Thomson Licensing (FR)

( * ) Notice: Subject to any disclaimer, the term of this patent is extended or adjusted under 35 U.S.C. 154(b) by 212 days.

(21) Appl. No.: 12/998,779

(22) PCT Filed: Nov. 19, 2009

(86) PCT No.: PCT/EP2009/065478
§ 371 (c)(1),
(2), (4) Date: Jun. 1, 2011

(87) PCT Pub. No.: WO2010/063589
PCT Pub. Date: Jun. 10, 2010

(65) Prior Publication Data
US 2012/0068138 A1 Mar. 22, 2012

(30) Foreign Application Priority Data
Dec. 2, 2008 (EP) .................................... 08305875

(51) Int. Cl.
*G11B 7/24* (2013.01)
(52) U.S. Cl.
USPC ............... 369/275.2; 369/275.1; 428/64.1; 430/270.13
(58) Field of Classification Search
USPC .......... 369/275.1, 275.2, 275.3, 275.4, 275.5; 428/64.1, 64.2, 64.4; 430/321, 320, 430/270.1, 270.11, 270.13; 720/718
See application file for complete search history.

(56) References Cited

U.S. PATENT DOCUMENTS

| 7,232,598 B2 | 6/2007 | Ahn et al. | |
| 2003/0002428 A1* | 1/2003 | Cheong et al. | 369/275.2 |
| 2005/0153108 A1 | 7/2005 | Kim et al. | |

(Continued)

FOREIGN PATENT DOCUMENTS

| EP | 1492101 | 12/2004 |
| EP | 1912216 | 4/2008 |
| WO | WO2004088644 | 10/2004 |

OTHER PUBLICATIONS

Yoon et al., Super Resolution Read Only Memory Disc Using Super-Resolution Near-Filed Structure Technology, Japanese Journal of applied physics, Jul. 29, 2004, pp. 4945-4948, vol. 43, n° 7B, Japanese Society of Applied Physics, Japan.

(Continued)

*Primary Examiner* — Tan X Dinh
(74) *Attorney, Agent, or Firm* — Jack Schwartz and Associates, PLLC

(57) ABSTRACT

The optical storage medium comprises a substrate layer, a data layer arranged on the substrate layer, a first nonlinear layer with a first super-resolution structure arranged above the data layer, and a second nonlinear layer with a second super-resolution structure arranged above the first nonlinear layer, the first nonlinear layer comprising a material having an increased reflectivity when irradiated with a laser beam and the second nonlinear layer comprising a material showing a transparency when irradiated with a laser beam. The first nonlinear layer comprises in particular a semiconductor material of one of the III-V semiconductor family having a low band-gap. And the second nonlinear layer comprises in particular a phase change material, for example SbTe or AIST.

7 Claims, 3 Drawing Sheets

(56) References Cited

U.S. PATENT DOCUMENTS

| | | | |
|---|---|---|---|
| 2005/0254407 A1* | 11/2005 | Hwang et al. | 369/275.1 |
| 2005/0259563 A1 | 11/2005 | Ahn et al. | |
| 2006/0046013 A1* | 3/2006 | Bae et al. | 428/64.4 |
| 2006/0077764 A1 | 4/2006 | Liu | |
| 2006/0077765 A1 | 4/2006 | Kim et al. | |
| 2010/0220567 A1* | 9/2010 | Tajima et al. | 369/275.2 |
| 2011/0064902 A1* | 3/2011 | Fery et al. | 428/64.4 |

OTHER PUBLICATIONS

Hyot et al., "Phase Change Materials and Superrens", EPCOS—European Phase Change and Ovonics Science Symposium, Cambridge, England, Sep. 1, 2005, pp. 1-6.

Pichon et al., "Multiphysics Simulation of Super-Resolution BD ROM Optical Disk Readout" Optical Data Storage Topical Meeting, Quebec, Canada, Apr. 23-26, 2006, pp. 206-208.

International Search Report Dated Dec. 17, 2009 and European Search Report Dated Feb. 17, 2009.

* cited by examiner

OPTICAL STORAGE MEDIUM COMPRISING TWO NONLINEAR LAYERS

This application claims the benefit, under 35 U.S.C. §365 of International Application PCT/EP2009/065478, filed Nov. 19, 2009, which was published in accordance with PCT Article 21(2) on Jun. 19, 2009 in English and which claims the benefit of European patent application No. 08305875.0, filed Dec. 2, 2008.

TECHNICAL FIELD OF THE INVENTION

The present invention relates to an optical storage medium comprising a substrate layer, a data layer, a first and a second nonlinear layer having a super-resolution structure. The optical storage medium is in particular an optical disc for reading and/or writing data with a high data density.

BACKGROUND OF THE INVENTION

Optical storage media are media in which data are stored in an optically readable manner, for example by means of a laser and a photodetector being integrated within a pickup. The photodetector is used for detecting the reflected light of the laser beam when reading data from the storage medium. In the meanwhile a large variety of optical storage media are known, which are operated with different laser wavelength, and which have different sizes for providing storage capacities from below one Gigabyte up to 50 Gigabyte (GB). The formats include read-only formats such as Audio CD and Video DVD, write-once optical media such as CD-R and DVD-R, DVD+R, as well as rewritable formats like CD-RW, DVD-RW and DVD+RW. Digital data are stored on these media along tracks in one or more layers of the media.

The storage medium with the highest data capacity is at present the Blu-Ray disc (BD), which allows to store up to 50 GB on a dual layer disc. For reading and writing of a Blu-Ray disc an optical pickup with a laser wavelength of 405 nm is used. On the Blu-Ray disc a track pitch of 320 nm and a mark length from 2T to 8T and 9T is used, where T is the channel bit length, and which corresponds with a minimum mark length of 138-160 nm. The re-writable BD-RE disc is based on a phase change technology comprising a phase change layer, which uses for example a compound of AgInSbTe or GeSbTe.

New optical storage media with a super-resolution structure offer the possibility to increase the data density of the optical storage medium by a factor of two to four in one dimension as compared with the Blu-Ray disc. This is possible by a so-called super-resolution layer, which is placed above a data layer of the optical storage medium, and which significantly reduces the effective size of a light spot used for reading from or writing to the optical storage medium. The super-resolution layer is a nonlinear layer, which is also called mask layer because it is arranged above the data layer and for some specific materials only the high intensity center part of a laser beam can penetrate the mask layer. Further, semiconductor materials can be used as a nonlinear layer, e.g. InSb, which show a higher reflectivity in the center part of the focused laser beam, the reflectivity being dependent on the pit structure of a corresponding data layer. Therefore, the super-resolution effect allows to record and read data stored in marks of an optical disc, which have a size below the resolution limit of a corresponding optical pickup. The super-resolution structure is often also called a super-resolution near-field structure (Super-RENS) because it is assumed that the super-resolution effect is based on a super-resolution near-field effect.

In the articles Hyot et al, "Phase change materials and Super-RENS", E*PCOS05, Technical Digest, Cambridge, 2005, and Pichon et al, "Multiphysics Simulation of Super-Resolution BD ROM Optical Disk Readout" 2006 IEEE, 0-7803-9494-1/06, PP 206-208, a semi-conducting mask layer is proposed in which a local change of the refractive index can be obtained through photo generation of free carriers. A thermal description is given to provide information on temperature distribution during readout of a data layer.

In US20050153108 an optical storage medium is disclosed comprising a substrate layer, a data layer, a first and a second super-resolution layer used as mask layers and an insertion layer disposed between both mask layers. For the mask layers, oxides from the noble metals Pt, Au, Pd, or Ag are used. Optical storage media comprising at least two super resolution layers are also known from US2005259563, EP1492101 and U.S. Pat. No. 7,232,598. For nearly all of the metal oxide based optical storage media described in these references, the metal oxide is in particular used as a recording layer. The super-resolution effect is then partly based on a metal nanoparticle effect and partly based on a phase-change effect.

BRIEF SUMMARY OF THE INVENTION

The optical storage medium of the invention comprises a substrate layer, a data layer arranged on the substrate layer, a first nonlinear layer with a first super-resolution structure arranged above the data layer and a second nonlinear layer with a super-resolution structure arranged above the first nonlinear layer. The first nonlinear layer comprises a material having an increased reflectivity when irradiated with a laser beam and the second nonlinear layer comprises a material showing a transparency when irradiated with a laser.

The first nonlinear layer comprises in particular a semiconductor material of one of the III-V semiconductor family, having a low band-gap. The second nonlinear layer comprises in particular a chalcogenide alloy phase change material, for example SbTe or AIST. Several studies have shown that semiconductor materials of the III-V semiconductor family, for example InSb, are interesting candidates for a nonlinear layer arranged within a stack of layers for a high data density super-resolution optical disc. A nonlinear layer comprising such a semiconductor material exhibits an increased reflectivity when irradiated by laser light. The reflected laser light is sensitive in particular to a pit structure of the data layer arranged between the first nonlinear layer and the substrate layer.

The second nonlinear layer has a function to provide a thermal protection for the semiconductor material of the first nonlinear layer. The thermal behavior of the optical storage medium can be optimized by including a first dielectric layer between the substrate layer and the first nonlinear layer dielectric layer, a second dielectric layer between the first and the second nonlinear layer and a third dielectric layer between the second nonlinear layer. A cover layer is provided as an outside protection layer for the optical storage medium.

The first and the second nonlinear layers have advantageously a thickness within a range of 10-40 nm. The first dielectric layer has advantageously a thickness within a range of 50-100 nm, the second dielectric layer a thickness within a range of 40-70 nm and the third dielectric layer a thickness within a range of 20-40 nm.

The optical storage medium provides an improved heat protection for a first nonlinear layer having a material exhibiting an increased reflectivity when irradiated with a laser beam, in particular a semiconductor material, by including a second nonlinear layer having a material showing a transparency when irradiated with a laser beam. With a layer stack of this kind, in particular a super-resolution ROM-disc with a very high longtime stability can be provided having a data layer which is not destroyed by a large number of reading cycles.

BRIEF DESCRIPTION OF THE DRAWINGS

Preferred embodiments of the invention are explained in more detail below by way of example with reference to schematic drawings, which show.

DETAILED DESCRIPTION OF PREFERRED EMBODIMENTS

Figure 1:
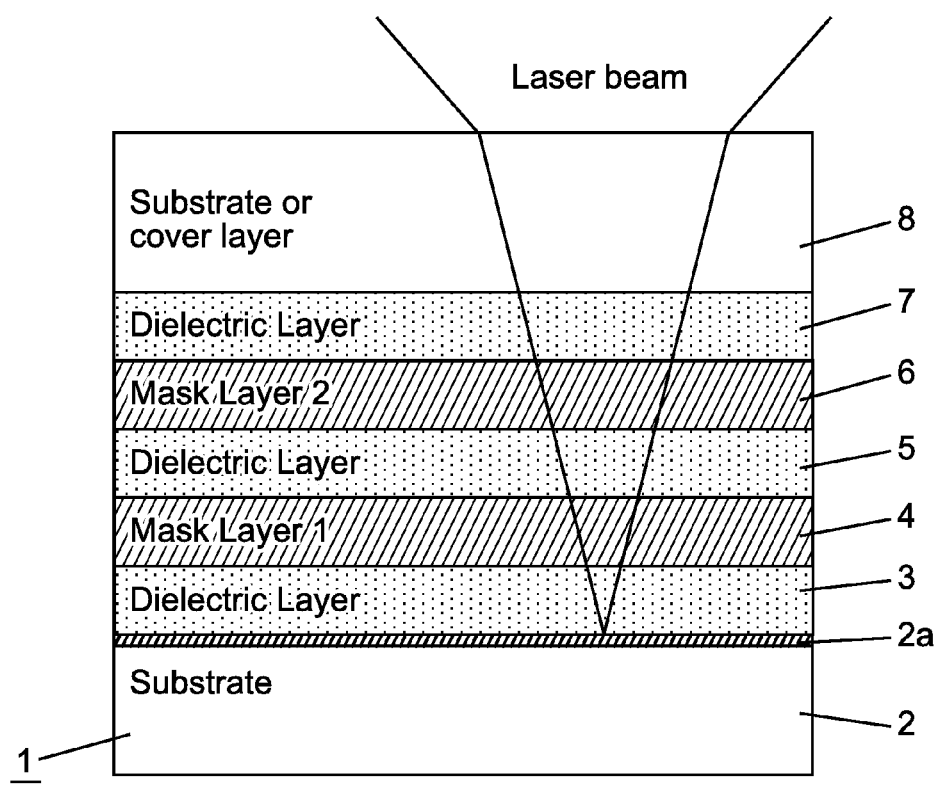
FIG. 1 an optical storage medium with a first and a second nonlinear layer having a super resolution structure according to the invention, FIG. 2 measured reflectivity values in dependency of the incident laser power for an optical disc comprising an InSb nonlinear layer, FIG. 3 measured reflectivity values of an optical disc comprising a nonlinear AIST layer in dependency of the incident laser power for different speeds, FIG. 4 carrier-to-noise ratios in dependency of the laser power for a super-resolution optical disc comprising InSb and for a super-resolution optical disc comprising AIST, FIG. 5 jitter values in dependency of the laser power for a super-resolution disc comprising InSb as a nonlinear layer, and FIG. 6 calculated contrast values for a super-resolution disc in accordance with FIG. 1.

In FIG. 1 an embodiment of an optical storage medium 1 according to the invention is shown, which comprises a substrate layer 2, on which a data layer 2a is arranged. The data layer 2a comprises in particular a pit structure as a read-only data layer. Above the data layer 2a a first nonlinear layer 4 with a first super-resolution structure and a second nonlinear layer 6 with a second super-resolution structure are arranged as mask layers for the data layer 2a. The first nonlinear layer 4 comprises a material having an increased reflectivity when irradiated with a laser beam and the second nonlinear layer 6 comprises a material showing a transparency when irradiated with a laser beam.

The data layer 2a is separated advantageously by a first dielectric layer 3 from the first nonlinear layer 4. A second dielectric layer 5 is arranged between the first nonlinear layer 4 and the second nonlinear layer 6 and a third dielectric layer 7 arranged above the second nonlinear layer 6. Above the third dielectric layer 7 further a cover layer 8 is placed as a protection for the optical storage medium 1. A laser beam for reading or writing of data is applied from the top, penetrating first the cover layer 8, and focused onto the data layer 2a.

The first nonlinear layer 4 comprises in particular a semiconductor material of the III-V semiconductor family, for example GaSb or an indium alloy with a bandgap below 1 eV, for example InAs or InSb. The semiconductor material may be doped in addition by using an n-doping material, for example selenium and/or tellurium, for increasing the reflectivity of the first nonlinear layer 4, when irradiated with a laser beam. The second nonlinear layer 6 comprises in particular a phase change material showing a transparency when irradiated by laser light, for example a chalcogenide alloy, as AgInSbTe (AIST) or SbTe.

For a preferred embodiment, the first dielectric layer 3 has a thickness within a range of 50-100 nm, the second dielectric layer 5 a thickness within a range of 40-70 nm and the third dielectric layer a thickness within a range of 20-40 nm. The first and the second nonlinear layers have for example a thickness within a range of 10-40 nm for which best modulation signals are expected. The optical storage medium is in particular an optical disc having a read-only data layer with a pit structure.

Figure 2:
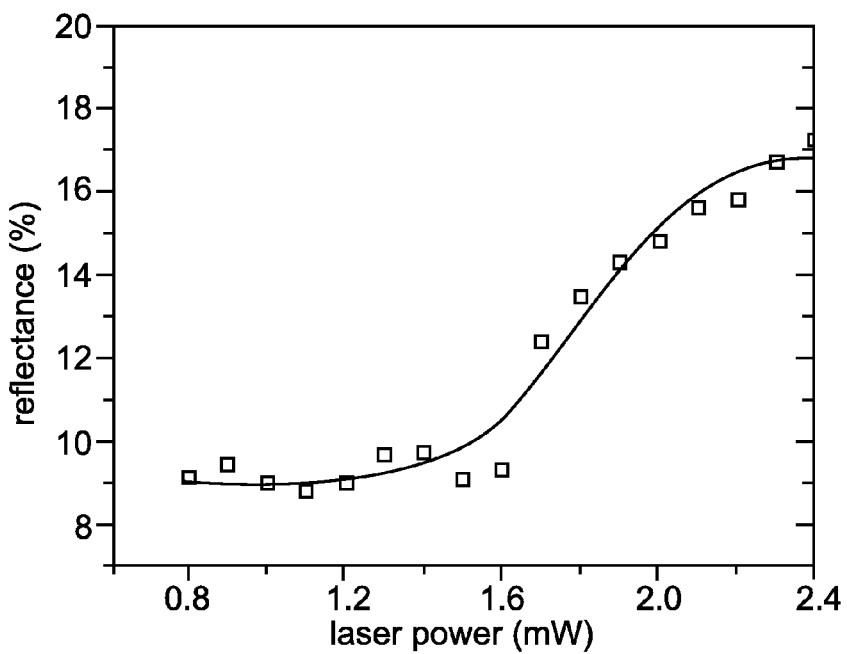

An optical storage medium comprising InSb as a super-resolution layer shows an increase in reflectivity, when an irradiating laser power is increased above 1,6 mW, as shown in FIG. 2. This can be explained by transitions of electrons from the valence band to the conduction band of InSb. A semiconductor with a high electron density in the conduction band has a high reflectivity for light comparable to a metal. The electron density in the conduction band can be further increased by using an n-doping material for doping of the semiconductor, for example selenium or tellurium.

Figure 3:
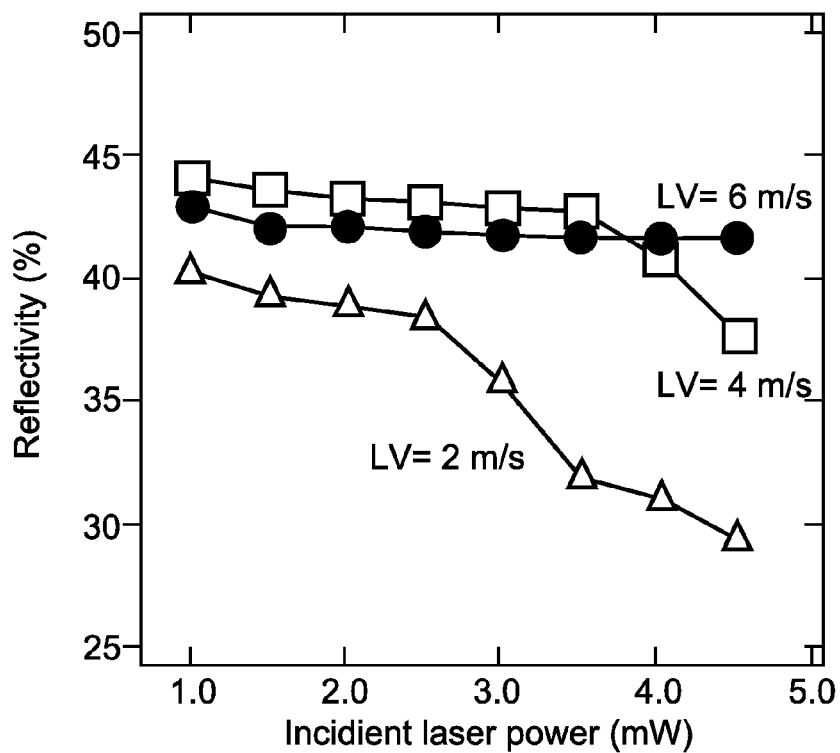

When a phase change material is used as a super-resolution layer of an optical disc, the reflectivity of the optical disc is reduced, when the laser power has a sufficiently high intensity level for providing the super-resolution effect, as shown in FIG. 3. FIG. 3 shows measured reflectivity values in dependency of the incident laser power for an optical disc comprising an AIST layer as a Super-RENS layer, sandwiched between two ZnS:SiO$_2$ dielectric layers as protection layers. A laser wavelength of $\lambda$=635 nm was used, and reflectivity measurements were made for linear velocities of 2 m/s, 4 m/s and 6 m/s of the laser spot on the optical disc.

As can be seen for lower linear velocities, the reflectivity of the optical disc decreases sharply for higher laser powers, which suggests that at a certain threshold the super-resolution effect takes place with the effect that the AIST layer becomes transparent in a region of the laser spot on the optical disc having a sufficiently high intensity, with the result that the reflectivity is decreased. For linear velocities of 6 m/s, no decrease in reflectivity is measured for laser intensities up to 4.5 mW, which suggests that the laser intensity is not sufficiently high for heating the AIST layer as necessary for providing the super-resolution effect.

Figure 4:
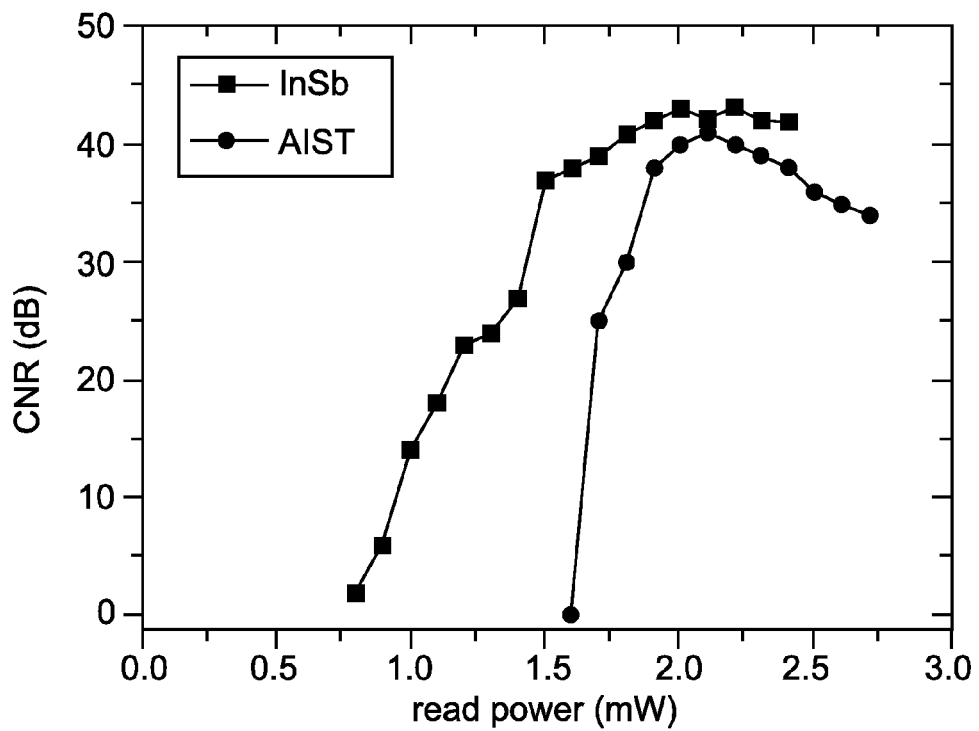

An optical disc using InSb as a super-resolution layer exhibits sufficiently high carrier-to-noise ratios for application as a reliable optical storage medium at laser powers being substantially lower than laser powers required for reading data of a Super-RENS disc using AIST as a super-resolution layer, as shown in FIG. 4. FIG. 4 shows carrier-to-noise ratios CNR in dependency of the reading power of a laser for an optical disc comprising an InSb layer of 20 nm as a super-resolution layer and an optical disc comprising AIST with a thickness of 25 nm as a super-resolution layer. Each super-resolution layer is sandwiched between two dielectric layers. As can be seen, for the optical disc comprising InSb as the super-resolution layer, a laser power of about 1,5 mW is sufficient for obtaining a carrier-to-noise ratio of about 40 dB, whereas for the super-resolution disc comprising AIST as the nonlinear layer, a laser power of about 2 mW is required for providing a corresponding carrier-to-noise ratio.

An optical disc comprising an InSb layer as the super-resolution layer seems to be clearly advantageous therefore with regard to an optical disc comprising an AIST layer as the super-resolution layer because a lower laser power can be used for reading of data, which is advantageous for the lifetime of the laser. But recent investigations have shown that for optical discs comprising InSb as a super-resolution layer, the data structure of the optical disc can be damaged irreversibly, when reading data with a laser power already within a range of 1 mW to 1,9 mW.

Figure 5:
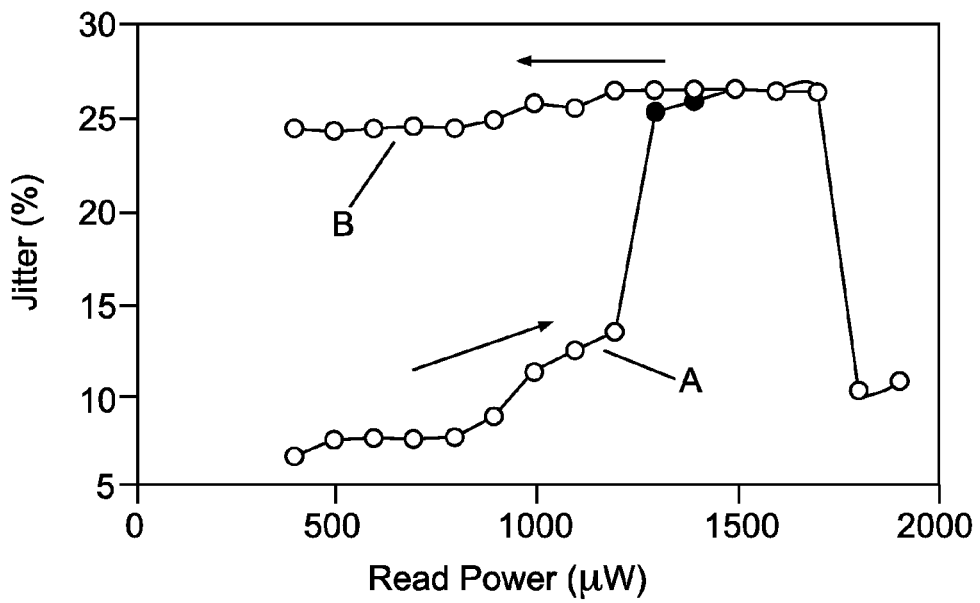

In FIG. 5 jitter measurements as a function of the reading power are shown for an optical disc comprising InSb as a super-resolution layer sandwiched between two dielectric layers. A first graph A relates to measurements, in which the reading power is continuously increased from 0.5 mW up to about 2 mW for a selected region of the optical disc. As shown by graph A, the jitter values remain below a reasonably low jitter value of 15% up to a laser power of about 1.300 mW, but then the jitter value increases by about a factor of two to a non-tolerable value.

The second graph B shows jitter measurements performed on another selected region of the optical disc by starting with a high power of about 2 mW and decreasing continuously the read power to values of about 0.5 mW. As can be seen, the jitter value increases sharply after a short period to values of about 25%, which value is essentially retained also for smaller laser powers down to about 0.5 mW. This clearly shows that the data structure is irreversibly damaged by the higher laser power. An optical disc with InSb as the super-resolution layer therefore may not provide a sufficient long-term stability as necessary for a commercially usable optical storage medium.

By using in addition to a first nonlinear layer having a semiconductor material as a super-resolution structure a second nonlinear layer arranged above the first nonlinear layer, a thermal protection can be provided for the first nonlinear layer. For the second nonlinear layer in particular a phase-change material can be used, which shows a transparency when irradiated with a high intensity layer beam. As known from phase-change materials used for super-resolution layers, only for the high intensity center part of the light spot as provided by a pickup on the data layer of the optical storage medium, the intensity is sufficiently high to provide the super-resolution effect. The circumferential light beam is reflected by the phase-change material and only for the center part an aperture is provided, which can be penetrated by the light beam. The penetrating light of the center beam is impinging then on the second nonlinear layer, which shows an increased reflectivity in dependency of the mark/space structure, e.g. pit structure, of a corresponding data layer, when irradiated with laser light of sufficient intensity. Therefore, because the essential part of the laser light is reflected by the second nonlinear layer, the heat load of the first nonlinear layer is considerably reduced.

The optical behavior of the optical storage medium can be improved by including at least one or several dielectric layers, in particular a first dielectric layer 3 disposed between the substrate layer 2 and the first nonlinear layer 4, a second dielectric layer 5 disposed between the first and the second nonlinear layer 6 and a third dielectric layer 7 between the cover layer 8 and the second nonlinear layer 6, as shown and explained with regard to FIG. 1.

Optimized thickness values can be obtained for the dielectric layers, also for the two nonlinear layers, by using a simulation, which takes into account the reflectivity of the respective layers as a function of the light intensity. The simulation has been performed by using InSb as a first nonlinear layer and AIST as a second nonlinear layer and by including three dielectric layers using ZnS:SiO2 as the dielectric material, the three dielectric layers having thickness values of d3, d5 and d7 respectively. An optical contrast can be calculated by taking into account the reflectivity of the layer stack for high and low laser powers: $C=(R_h-R_l)/R_l$, where $R_h$ and $R_l$ are the layer stack reflectivity at high and low laser power.

Figure 6:
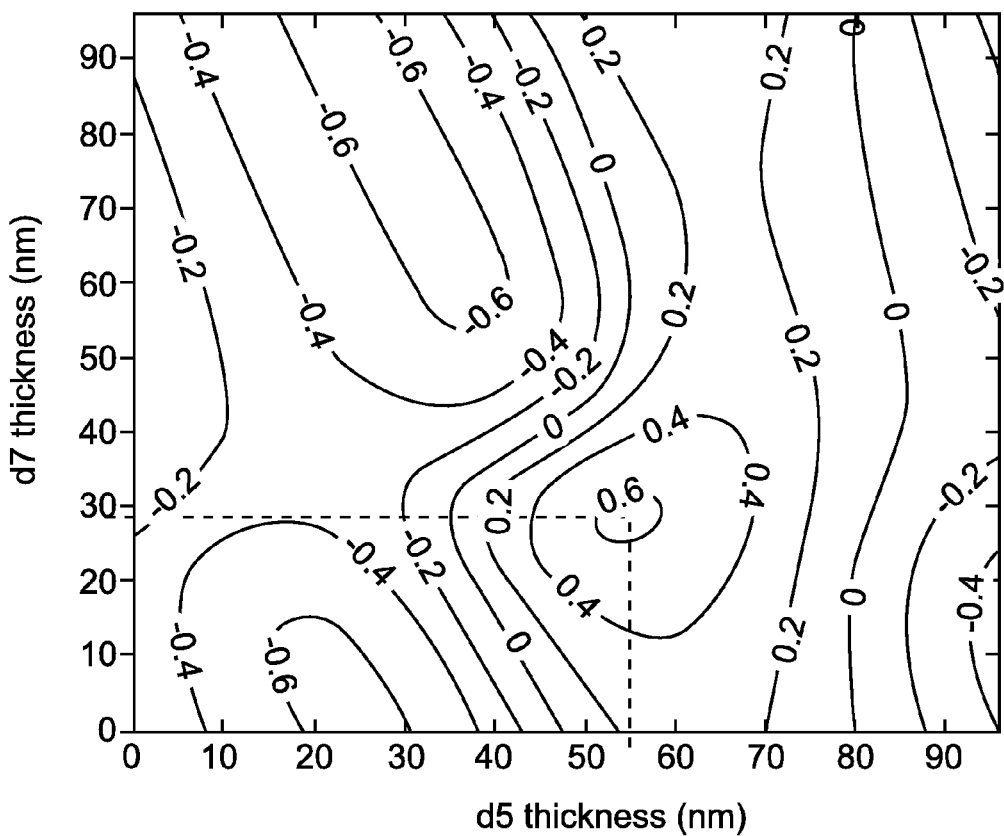

A maximum contrast of 60% can be obtained for thickness values of d5=55 nm and d3=70 nm as shown in FIG. 6, by including a thickness value of d7=30 nm. For the thickness of the InSb layer 25 nm and for the thickness of the AIST layer 15 nm has been taken into account, which values have been chosen because with these values it is expected to enable optical non-linearity at a useful laser power. It is noticed that the thickness d5+d3 is about 125 nm, which is close to an anti-reflectivity condition for an optical cavity formed between the AIST layer 6 and the substrate layer 2, which confines therefore the electromagnetic energy in this cavity and should help to trigger the super-resolution effect of the InSb layer 4.

A contrast of 60% is comparable with a super-resolution disk using only one InSb layer as a super-resolution layer, for which a simulation gives a contrast value of about 65%. In conclusion, using an optical storage medium with a first nonlinear layer with a material having an increased reflectivity and a second nonlinear layer comprising a material showing a transparency when irradiated with a laser beam, a super-resolution optical storage medium can be provided, which shows a reflectivity increase similar to a super-resolution storage medium comprising only a single InSb layer. The second nonlinear layer acts as a heat protection layer for the first nonlinear layer because only a small part of the laser light, in dependency of the small aperture as provided by the super-resolution effect of the second nonlinear layer, is used for reading or writing of data on the data layer below the first nonlinear layer.

Also other embodiments of the invention can be made by a person skilled in the art without departing from the spirit and scope of the present invention. The optical storage medium may be used in particular also as a recordable storage medium. Also other, not described materials may be used for the first and second nonlinear layers. The invention resides therefore in the claims herein after appended.

The invention claimed is:

1. Optical storage medium comprising
a substrate layer,
a data layer arranged on the substrate layer,
a first nonlinear layer with a first super-resolution structure arranged above the data layer,
a second nonlinear layer with a second super-resolution structure arranged above the first nonlinear layer,
a first dielectric layer disposed between the substrate layer and the first nonlinear layer, a second dielectric layer disposed between the first and the second nonlinear layer and a third dielectric layer disposed between the cover layer and the second nonlinear layer, wherein
the first nonlinear layer comprises a semiconductor material being one of the III-V semiconductor family and having an increased reflectivity when irradiated with a laser beam, and
the second nonlinear layer comprises a chalcogenide alloy as a phase-change material showing an increased transparency when irradiated with a laser beam, for providing a thermal protection for the material of the first nonlinear layer.

2. Optical storage medium according to claim 1, wherein the semiconductor material comprises or consists of an indium alloy having a bandgap below 1 eV.

3. Optical storage medium according to claim 1, wherein the first nonlinear layer comprises an n-doped semiconductor material with a dopant, which is selected such that the reflectivity of the first nonlinear layer is increased, when irradiated with a laser beam.

4. Optical storage medium according to claim 1, comprising a cover layer as a protection layer being disposed above the second nonlinear layer and wherein the optical storage medium is designed for operating with an optical pickup providing a laser beam penetrating first the cover layer.

5. Optical storage medium according to claim 1, wherein the first dielectric layer has a thickness within a range of 50-100 nm, the second dielectric layer has a thickness within a range of 40-70 nm and the third dielectric layer has a thickness within a range of 10-50 nm.

6. Optical storage medium according to claim 1, wherein the first and the second nonlinear layer have a thickness within a range of 10-40 nm.

7. Optical storage medium according to claim 1, wherein the optical storage medium is an optical disc and wherein the data layer is arranged on the substrate layer as a read-only data layer with a pit structure.

* * * * *